US010245717B2

(12) United States Patent
Schenk et al.

(10) Patent No.: US 10,245,717 B2
(45) Date of Patent: Apr. 2, 2019

(54) DRILLING DEVICE AND FRICTION CLUTCH FOR A DRILLING DEVICE

(71) Applicant: Roehm GmbH, Sontheim/Brenz (DE)

(72) Inventors: Peter Schenk, Niederstotzingen (DE); Patrick Hengsberger, Sontheim (DE)

(73) Assignee: ROEHM GMBH, Sontheim/Brenz (DE)

( * ) Notice: Subject to any disclaimer, the term of this patent is extended or adjusted under 35 U.S.C. 154(b) by 692 days.

(21) Appl. No.: 14/672,778

(22) Filed: Mar. 30, 2015

(65) Prior Publication Data

US 2015/0273678 A1    Oct. 1, 2015

(30) Foreign Application Priority Data

Mar. 28, 2014   (DE) .......................... 10 2014 104 367

(51) Int. Cl.
*B25F 5/00* (2006.01)
*F16D 7/04* (2006.01)
(Continued)

(52) U.S. Cl.
CPC .............. *B25F 5/001* (2013.01); *F16D 7/005* (2013.01); *F16D 7/046* (2013.01); *F16D 7/08* (2013.01); *G05G 9/00* (2013.01); *Y10T 74/20012* (2015.01)

(58) Field of Classification Search
CPC ............. B25F 5/001; F16D 7/005; F16D 7/08
(Continued)

(56) References Cited

U.S. PATENT DOCUMENTS 7,314,097 B2    1/2008   Jenner et al.
9,174,281 B2   11/2015   Schenk
(Continued)

FOREIGN PATENT DOCUMENTS

DE   10 2011 055 869 A1    6/2013
JP         H11309677 A    11/1999
(Continued)

OTHER PUBLICATIONS

Japanese Office Action dated Oct. 23, 2018 in corresponding application JP2015-067221.

*Primary Examiner* — Chelsea E Stinson
(74) *Attorney, Agent, or Firm* — Muncy, Geissler, Olds & Lowe, P.C.

(57) ABSTRACT

A drilling device, which is adjustable at least between a clamping configuration, a drilling configuration and a screwing configuration, includes a machine housing and a machine spindle, which is drivable with the aid of a motor. A drill chuck having a jaw holder, in which clamping jaws are guided, which are adjustable with the aid of a threaded connection provided between an entrainer and a threaded sleeve is provided. A drill spindle, which is drivable by the motor via a planetary gear set, is disposed on the side facing the machine spindle and includes a sun wheel, a planet carrier, which carries at least one planet wheel, and a ring wheel, which has at least one cam, which interacts with at least one clutch element, which is fixed with respect to the ring gear in the drilling configuration. The at least one clutch element is supported with respect to the ring wheel, movable against a clamping spring force of a clamping spring, and the at least one clutch element is movably supported against a screw spring force, in the screwing configuration, the screw spring force resulting from a series connection of the clamping spring and a screw spring.

23 Claims, 10 Drawing Sheets

(51) Int. Cl.
  *G05G 9/00* (2006.01)
  *F16D 7/00* (2006.01)
  *F16D 7/08* (2006.01)

(58) Field of Classification Search
  USPC ............ 173/213, 47, 48, 216, 217, 176, 178
  See application file for complete search history.

(56) References Cited

U.S. PATENT DOCUMENTS

| | | |
|---|---|---|
| 9,415,448 B2 | 8/2016 | Schenk et al. |
| 9,649,697 B2 | 6/2017 | Schenk |
| 2013/0133908 A1* | 5/2013 | Schenk ................ B23B 45/008 173/47 |

FOREIGN PATENT DOCUMENTS

| | | |
|---|---|---|
| JP | 2002307322 A | 10/2002 |
| JP | 2008531310 A | 8/2008 |
| JP | 2011245609 A | 12/2011 |
| JP | 2012232407 A | 11/2012 |
| JP | 2013111747 A | 6/2013 |

* cited by examiner

DRILLING DEVICE AND FRICTION CLUTCH FOR A DRILLING DEVICE

This nonprovisional application claims priority under 35 U.S.C. § 119(a) to German Patent Application No. 10 2014 104 367.7, which was filed in Germany on Mar. 28, 2014, and which is herein incorporated by reference.

BACKGROUND OF THE INVENTION

Field of the Invention

The present invention relates to a drilling device, which is adjustable at least between a clamping configuration, a drilling configuration and a screwing configuration, comprising a machine housing and a machine spindle, which is drivable with the aid of a motor, as well as comprising a drill chuck having a jaw holder, in which clamping jaws are guided, which are adjustable with the aid of a threaded connection provided between an entrainer and a threaded sleeve, comprising a drill spindle, which is drivable by the motor via a planetary gear set, which is disposed on its side facing the machine spindle and includes a sun wheel, a planet carrier, which carries at least one planet wheel, and a ring wheel, which has at least one cam, which interacts with at least one clutch element fixed with respect to the ring gear in the drilling configuration. The invention furthermore relates to a friction clutch and a system for limiting the torque for a drilling device.

Description of the Background Art

A drilling device of the type mentioned at the outset is already known from DE 10 2011 055 869 A1, which corresponds to US 20130133908 and which is incorporated herein by reference. The drilling device shown therein has the advantage that a maximum torque acting upon a drive stem may be limited as a function of the selected operating mode. For example, the maximum possible torque in a screwing configuration is lower than that in a clamping or releasing configuration. The maximum possible torque is transmitted in drilling mode or in the drilling configuration.

In the conventional art, however, integrating a drilling device into a drilling machine still requires a complex intervention into the gear stages of the drilling machine to achieve the desired success, namely to achieve a torque-dependent supporting of the drive stem in the different operating modes.

SUMMARY OF THE INVENTION

It is therefore an object of the invention to provide a drilling device, with the aid of which a change to the existing gear set structure of a drilling machine is largely avoided. An object of the invention is furthermore to provide a friction clutch and a system for limiting torque, which does not require a far-reaching intervention into the gear set of a drilling machine.

The object relating to the drilling device is achieved in a drilling device in that the at least one clutch element is supported, movable against a clamping spring force of a clamping spring, with respect to the ring wheel in the clamping configuration, and at least one clutch element is supported, movable against a screw spring force, with respect to the ring wheel in the screwing configuration, the screw spring force resulting from a series connection of the clamping spring and a screw spring.

As a result, the system for limiting the maximum clamping torque may thus also be used to limit the maximum screwing torque. In other words, the clamping torque clutch is integrated into the screwing torque clutch. This not only saves space but also allows the final gear stage of the drilling machine to remain largely untouched if a drilling machine having a drilling device is to be combined with a torque control system of this type. The at least one clutch element may be mounted radially on an outer circumferential surface of the ring wheel, whereby the drilling device has a very short axial design. On the other hand, the at least one clutch element may be alternatively also axially oriented and rest against a front side of the ring wheel facing away from the machine spindle. As a result, the at least one clutch element is axially fixed in the drilling configuration or axially movable in the screwing configuration if a relevant torque is exceeded.

For easy operability, it has proven to be particularly favorable that a shift sleeve is provided between the configurations for manual switching.

In another embodiment, the screw spring and the clamping spring are separated by a separating disk, which is fixed with respect to the ring wheel or axially thereto in the clamping configuration, but is adjustably disposed with respect to the ring wheel or axially thereto in the screwing configuration. This separating disk may thus be used to activate the series connection formed by the screw spring and the clamping spring in the screwing configuration and, conversely, deactivate it in the clamping configuration.

The clamping spring can be disposed on a side of the separating disk facing the ring wheel or the machine spindle and if the screw spring is disposed on the side of the separating disk facing away from the ring wheel or the machine spindle. This ensures that, in the clamping configuration, the clamping spring may act upon the at least one clutch element completely independently of the spring force of the screw spring. As soon as the separating disk is movable with respect to the ring disk or axially thereto, the clamping spring and the screw spring act upon the at least one or the multiple clutch element(s) simultaneously, i.e., in a series connection.

It has proven to be favorable if an anti-rotation system is active between the machine housing and the separating disk for the purpose of rotatably fixedly supporting the separating disk with respect to the machine housing. This ensures that the separating disk does not rotate when switching the drilling device between the different operating modes, which could result in faulty shifting operations within the drilling device.

In an embodiment the separating disk can have a guiding element, which blocks a movement with respect to the ring wheel or an axial movement of the separating disk in the clamping configuration. Due to this guiding element, the spring force of the screw spring may thus be decoupled from the clamping force of the clamping spring.

The guiding element may be used in an anti-rotation system, which is formed by the guiding element and a guiding groove axially formed in the machine housing. The number of components of the drilling device may thus be reduced, since the guiding element now provides two different functions, namely the use in an anti-rotation system, on the one hand, and the blocking of a mobility of the separating disk, on the other hand.

According to another embodiment, it is provided that the shift sleeve can include a radial guide for guiding the guiding element in the clamping configuration and possibly in the drilling configuration, and the shift sleeve can have an axial guide for guiding the guiding element in the screwing configuration. The radial guide in the shift sleeve, which is axially fixed with respect to the machine housing, provides an axially oriented limiting or an axial blocking of the guiding element of the separating disk. The separating disk may be axially adjusted only in the screwing configuration, when the guiding element of the separating disk is disposed in alignment with the axial guide of the shift sleeve, whereby the series connection between the clamping spring and the screw spring is active.

According to an embodiment of the invention, the at least one clutch element can have a multi-part design, including at least one ring wheel clutch part and at least one spring clutch part. The ring wheel clutch part interacts with the ring wheel, while the spring clutch part is acted upon by a spring, in particular by the clamping spring. The ring wheel clutch part and the spring clutch part are designed to be separable from each other.

The at least one ring wheel clutch part can be guided in the machine housing or a clutch ring, which is rotatably fixedly coupled with the machine housing, and if an orifice ring, which is rotatably fixedly connected to the shift sleeve or forms a single piece therewith, is disposed coaxially to the machine housing and has at least one, possibly axial, opening, in which the at least one spring clutch part is disposed. Due to the arrangement described above, the orifice ring may be rotated with respect to the machine housing or the clutch ring, whereby the at least one ring wheel clutch may likewise be adjusted, possibly radially, with respect to the at least one spring clutch part.

According to another embodiment, the diameter of the at least one ring wheel clutch part can be smaller or equal to the diameter of the spring clutch part. This ensures that the ring wheel clutch part is also able to enter an axial opening of the orifice ring to be acted upon—at least indirectly—by the clamping spring or the series connection formed by the clamping spring and the screw spring.

To provide a particularly effective friction clutch for the drilling device, the at least one spring clutch part and the at least one ring wheel part corresponding thereto can be disposed in alignment on a shared spring axis exclusively in the screwing configuration and the clamping configuration.

To be able to set different torques for the screwing configuration of the drilling device, an axially adjustable compression element can be provided for varying the screw spring force. This compression element may compress the springs, in particular the screw spring, whereby the torque at which the mechanical friction clutch is released may be adjusted.

Although, to adjust the clamping jaws in the clamping configuration, it is necessary only to provide a relative rotation of the drill spindle, which is rotatably fixedly connected to the threaded sleeve, with respect to the jaw holder, it is advantageous if the jaw holder is rotatably fixedly supported with respect to the machine housing in the clamping configuration and is rotatably fixedly supported with respect to the drill spindle in the screwing configuration and in the drilling configuration. This is associated with the advantage that a defined adjustability of the clamping jaws takes place within the drilling device in the clamping configuration. The motor used for the drilling device may be operated in a clockwise rotation and in a counterclockwise rotation, so that the clamping jaws are clamped during an operation of the motor in a first direction of rotation corresponding to the clamping operation, and the clamping jaws are released during operation of the motor in a second direction of rotation corresponding to the releasing operation. Clamping configuration can therefore be understood to mean not only the configuration that is used exclusively to clamp the drilling device but simultaneously also the configuration which permits the releasing operation for the clamping jaws. The same also applies to the drilling device in the drilling configuration, so that a clockwise rotation and a counterclockwise rotation are possible here as well, should it be necessary to operate the drill tool in a direction of rotation oriented against the drilling direction. In the screwing configuration, for example, a counter-clockwise rotation may loosen a screw, and a clockwise rotation may tighten a screw, and vice versa.

For an easy adjustability of the drilling device between the operating modes, it has proven to be particularly preferable if the shift sleeve includes a dial having a shifting gate, in which a control element is guided, which is adjustable between the configurations.

It has proven to be advantageous if the control element is coupled with a sliding sleeve, which interacts with the jaw holder, in such a way that it rotatably fixedly supports the jaw holder with respect to the machine housing exclusively in the clamping configuration. The sliding sleeve thus forms a coupling element, which rotatably fixedly positions the jaw holder in a particularly easy manner either with respect to the machine housing or with respect to the drill spindle.

To ensure a secure adjustment of the sliding sleeve in the axial direction, according to an embodiment, the control element can be disposed with respect to the machine housing in a rotatably fixed manner, i.e., secured against rotation.

To be able to make the drilling device even more compact, the shifting gate can be designed as an annular recess in an inner wall of the dial, in which the control element, designed as a control clip, is guided. The use of a control clip is sensible, since it may be very easily formed by bending or forming and does not weigh very much on its own.

In an embodiment, the cams can be formed as front cams on a side of the ring wheel facing away from the machine spindle. The cams thus are not mounted radially on the ring wheel, so that, as a result, the drilling device may accordingly be designed with a small diameter. Conversely, in another embodiment of the invention, the cams can be designed as radial cams, so that a radial friction clutch is provided, whereby the drilling device may be made shorter.

The friction clutch for limiting the torque in a drilling device provides a ring wheel which includes a clutch side having cams as well as at least one clutch element resting against the clutch side. The clutch element can be fixed in its position with respect to the ring wheel in a drilling configuration. In a clamping configuration, it is furthermore movably supported with respect to the ring wheel against a clamping spring force of a clamping spring. In a screwing configuration, the clutch element is movably supported with respect to the ring wheel against a screw spring force, which results from a series connection formed by the clamping spring and a screw spring.

This is also associated with the advantage that it is not necessary to use two fully independent spring elements to vary the contact pressure of the clutch elements onto the clutch side, using the cams of the ring wheel. Instead, the spring forces of the clamping spring and the screw spring may be superimposed by the series connection, whereby a changed torque which releases the friction clutch sets in. The friction clutch may be oriented radially or also axially with respect to the ring wheel. In a radial arrangement of the friction clutch, the cams are disposed on the radial outer surface of the ring wheel; in this case, the clutch elements are situated radially in the machine housing or in an orifice ring disposed coaxially to the machine housing.

An embodiment of the friction clutch provides that the clamping spring and the screw spring can be disposed axially on the side of the ring wheel facing away from the cams. The clutch elements in the machine housing may then be fixed axially, in this constellation, only the ring wheel executing an axial movement in the clamping configuration or in the screwing configuration if predefined torques are exceeded. In other words, the ring wheel moves in its axial position back against the clamping spring force or against the screw spring force if a predefined torque is exceeded.

Another embodiment provides that the clamping spring and the screw spring can be disposed on the side of the at least one clutch element facing away from the ring wheel. This allows an existing drilling machine to be expanded by a system having a friction clutch according to the present invention. Far less intervention into the gear stages of the drilling machine is required than in previously known torque limiting systems. The clutch elements may be mounted on the front side as the clutch side of the ring wheel of the last gear stage of the drilling machine, using the clamping spring and the screw spring, for the purpose of providing a friction clutch which is released at different permanently predetermined torques.

The system has the advantage that it may be used not only in a mechanical friction clutch but also in an electronic, i.e., sensor-controlled, clutch in a drill chuck.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
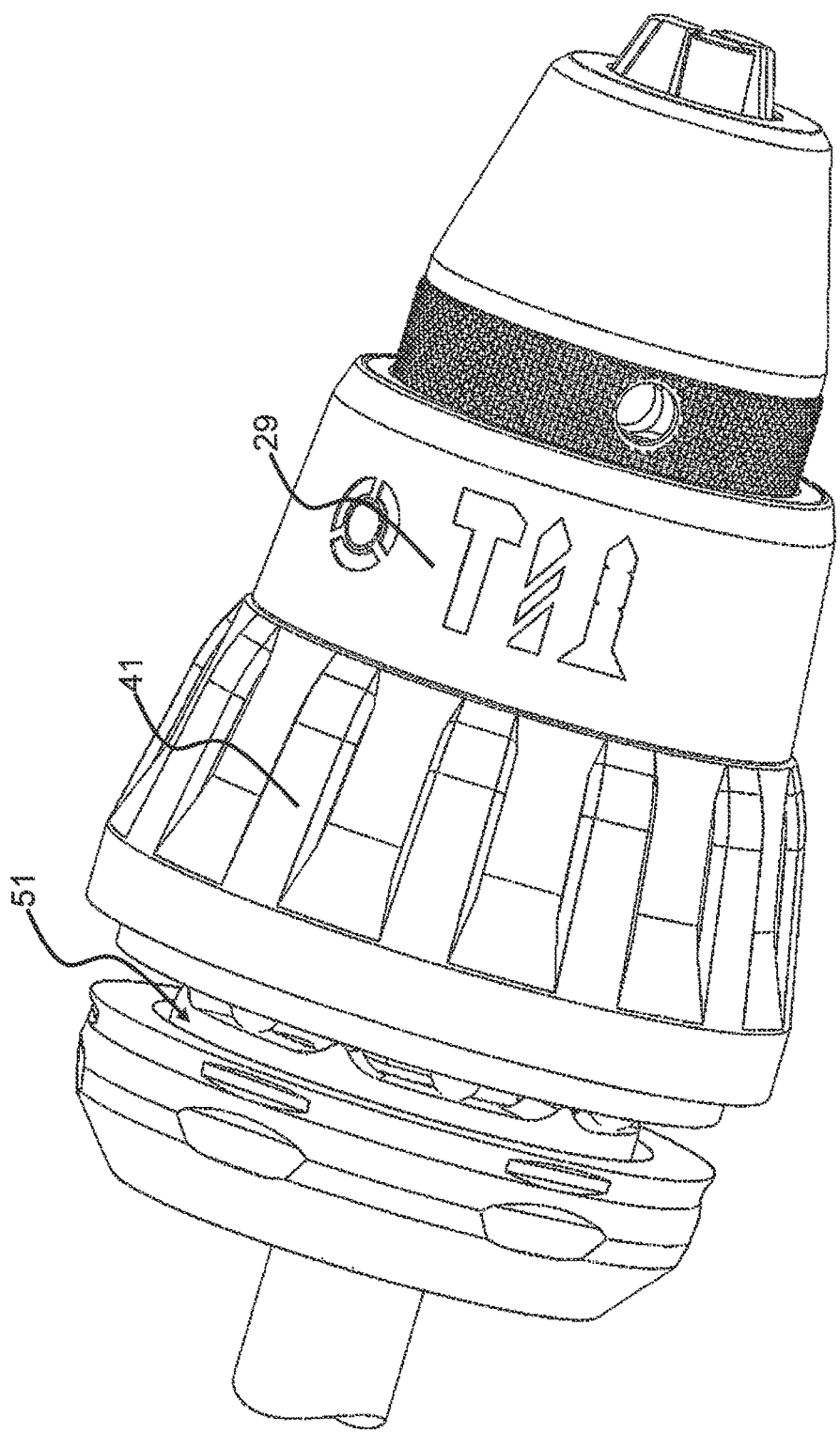
FIG. 1 shows a perspective view of the drilling device according to the invention.

The drawings show a drilling device as well as a friction clutch 51 for a drilling device.

In the illustrated exemplary embodiment, the drilling device may be switched between a clamping configuration, a screwing configuration, a drilling configuration and a percussion drilling configuration. The drilling device in the illustrated specific embodiment comprises a multi-part machine housing 1 as well as a machine spindle 2, which is drivable with the aid of a motor, which is not illustrated in greater detail. A planetary gear set 9 is furthermore provided on the end of machine spindle 2, a sun wheel 10, which is in engagement with multiple planet wheels 11, being rotatably fixedly mounted on machine spindle 2. These planet wheels 11 are supported on planet axes 36 of a planet carrier 12 and are able to roll on a ring wheel 13. Planet carrier 12 is rotatably fixedly connected to a drill spindle 8, which has a non-round cross section for this purpose, which interacts with a corresponding non-round cross section of planet carrier 12. Ring wheel 13 of the drilling device is rotatably fixedly supported with respect to machine housing 1 in a torque-dependent manner, depending on the configuration or operating mode.

According to the illustrated specific embodiment, drill spindle 8 is rotatably fixedly connected to a threaded sleeve 5 of a drill chuck on its side facing away from machine spindle 2. According to an alternative specific embodiment, drill spindle 8 merges in one piece with threaded sleeve 5 to form a threaded hollow spindle. An entrainer 4 having an outer thread is screwed into threaded sleeve 5 and forms a threaded connection 6 together with an inner thread of threaded sleeve 5. The drill chuck furthermore has a jaw holder 3, in which clamping jaws 7 are guided in the usual manner in guide slots and may be adjusted by entrainer 4 within this guide slot. To facilitate a relative rotation of threaded sleeve 5 with respect to jaw holder 3, a rolling bearing 37 is provided for the drill chuck in the illustrated specific embodiment. An adjustment of clamping jaws 7 may take place only with the aid of a relative rotation of threaded sleeve 5 with respect to jaw holder 3.

The drilling device has a friction clutch 51, which is explained in greater detail below. For this purpose, ring wheel 13 has cams 14, which interact with multiple coupling elements 15. According to the illustrated specific embodiment, ring wheel 13 has cams 14 designed as front cams 35 on its front side 30 facing away from machine spindle 2. This interaction between clutch elements 15 and front cams 35 holds ring wheel 13 in place and secures it against a rotation within or with respect to machine housing 1.

In the drilling configuration, clutch elements 15 are arranged rigidly on front side 34 of ring wheel 13. In the illustrated exemplary embodiment, clutch elements 15 are fixed axially with respect to ring wheel 13.

In the clamping configuration, clutch element 15 may move back axially against a clamping spring force of a clamping spring 16 in the direction of tool holder 38 of the drill chuck, and in the screwing configuration, clutch element 15 may move back axially against a screw spring force, which results from a series connection between a clamping spring 16 and a screw spring 17, likewise axially in the direction of tool holder 38 of the drill chuck.

Figure 2:
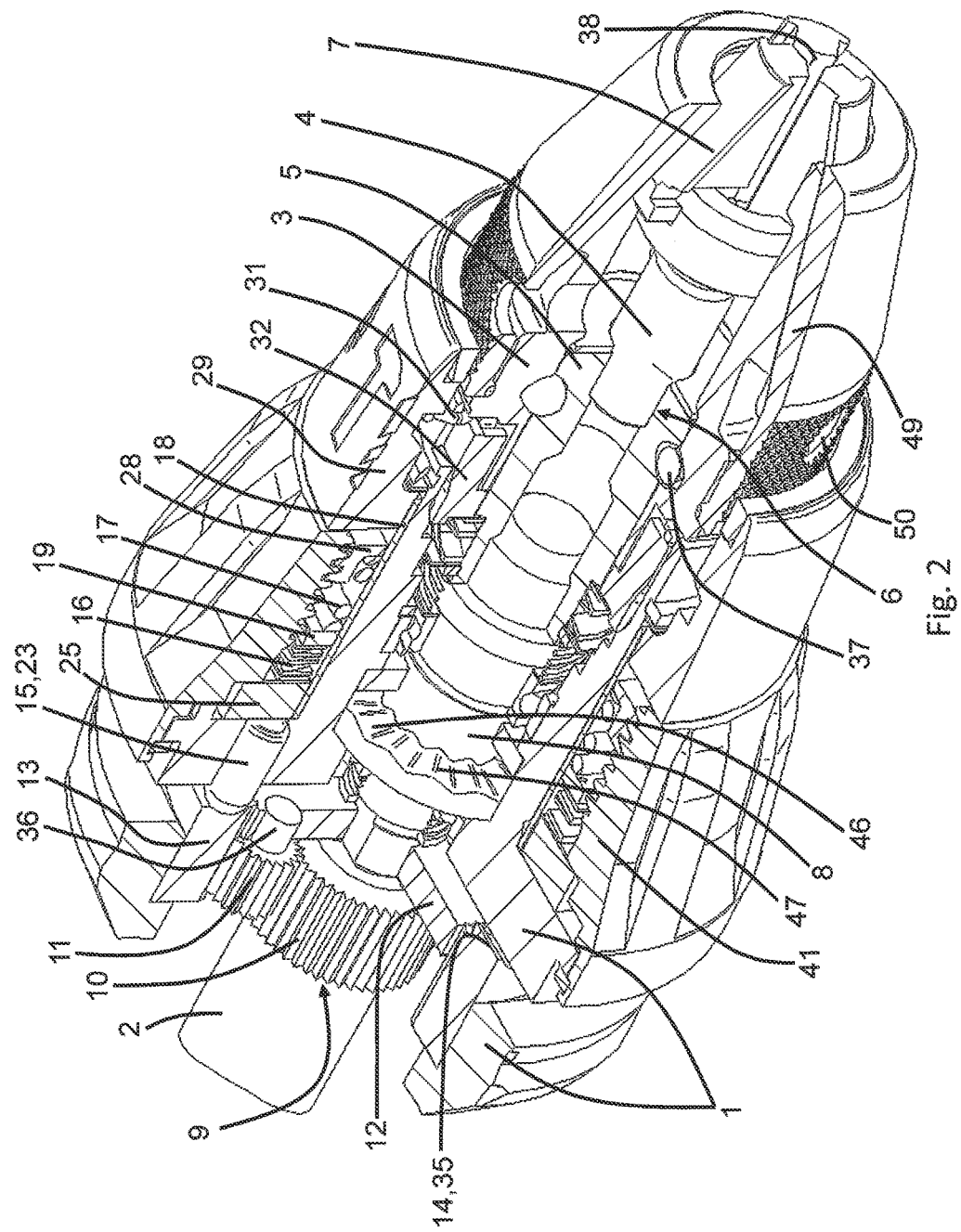
FIG. 2 shows a partially cut-away 3D view of the drilling device in the drilling configuration.
Figure 3:
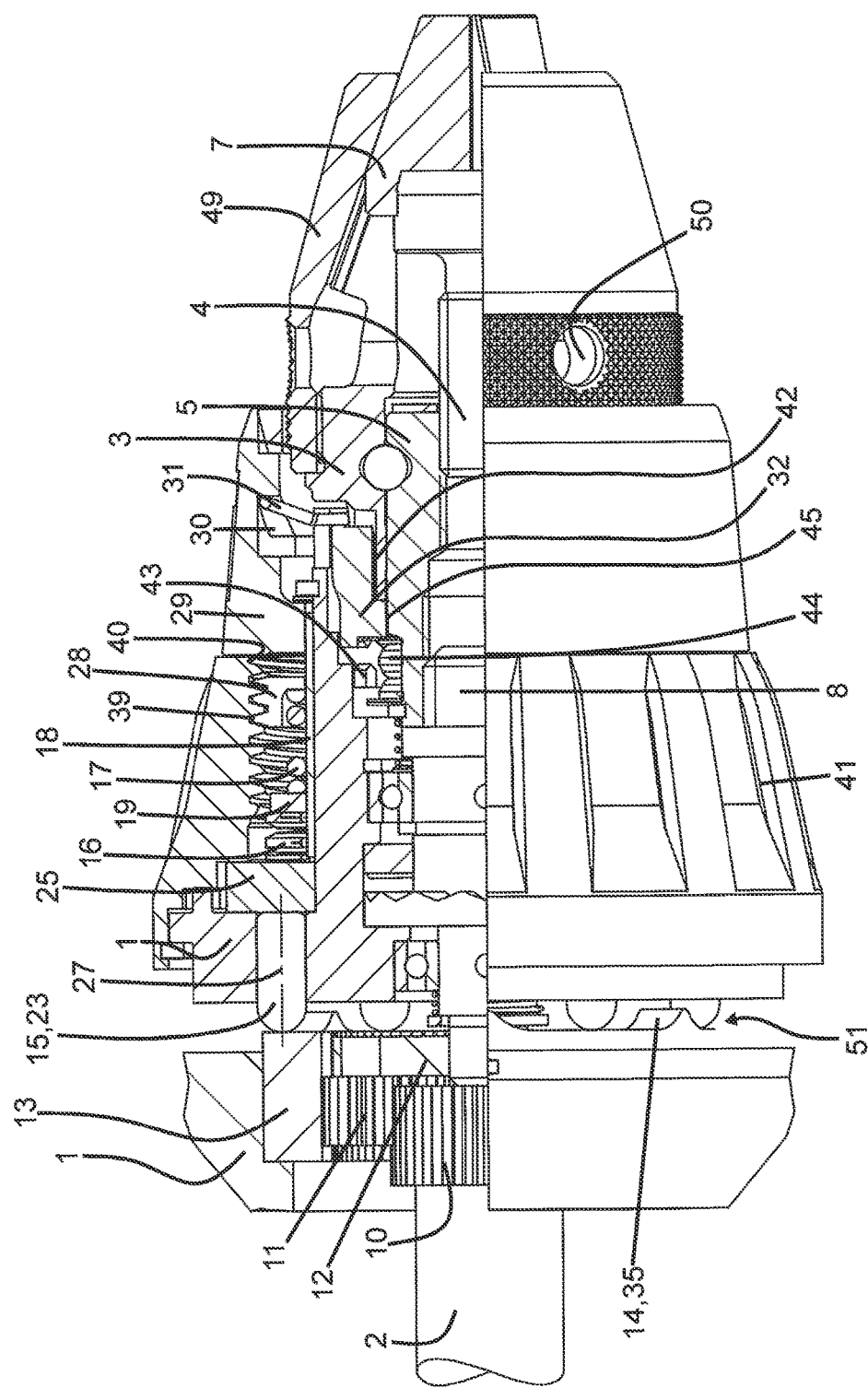
FIG. 3 shows a partially cut-away side view of the drilling device.

FIGS. 2 and 3 show the drilling device and friction clutch 51 in the drilling configuration. In the illustrated exemplary embodiment, clutch elements 15 have a multi-part design, namely a two-part design including a ring wheel clutch part 23 and a spring clutch part 24. These parts are designed to be separable. Ring wheel clutch part 23 is guided in machine housing 1, an orifice ring 25, which is rotatably fixedly connected to a shift sleeve 18 being disposed coaxially to machine housing 1 and having multiple axial openings 26, in which spring clutch parts 24 are disposed. Ring wheel clutch parts 23 are designed as clutch pins. Spring clutch parts 23, on the other hand, are shaped as balls. To reduce the number of components, it is also possible to design shift sleeve 18 in one piece with orifice ring 25.

Shift sleeve 18 is rotatably fixedly connected to a dial 29. Shift sleeve 18, and thus orifice ring 25, may be rotated relative to machine housing 1 via this dial 29. On the side of orifice ring 25 facing away from machine spindle 2, a clamping spring 16 is disposed, which, in turn, is arranged on a separating disk 19, in which a screw spring 17 is further supported. It is apparent from FIGS. 2 and 3 that, in the drilling configuration, orifice ring 25 is rotated with respect to machine housing 1 in such a way that ring wheel clutch part 23 is separated from spring clutch part 24. In other words, ring wheel clutch part 23 is thus supported on orifice ring 25 in the drilling configuration. As a result, ring wheel clutch part 23 is unable to move axially forward, i.e., in the direction of tool holder 28, to release ring wheel 13 from its rotatably fixed bearing. Therefore, the maximum torque is transmitted in the drilling configuration, since friction clutch 51 formed by cams 14 of ring wheel 13 and clutch elements 15 is inactive.

Figure 4:
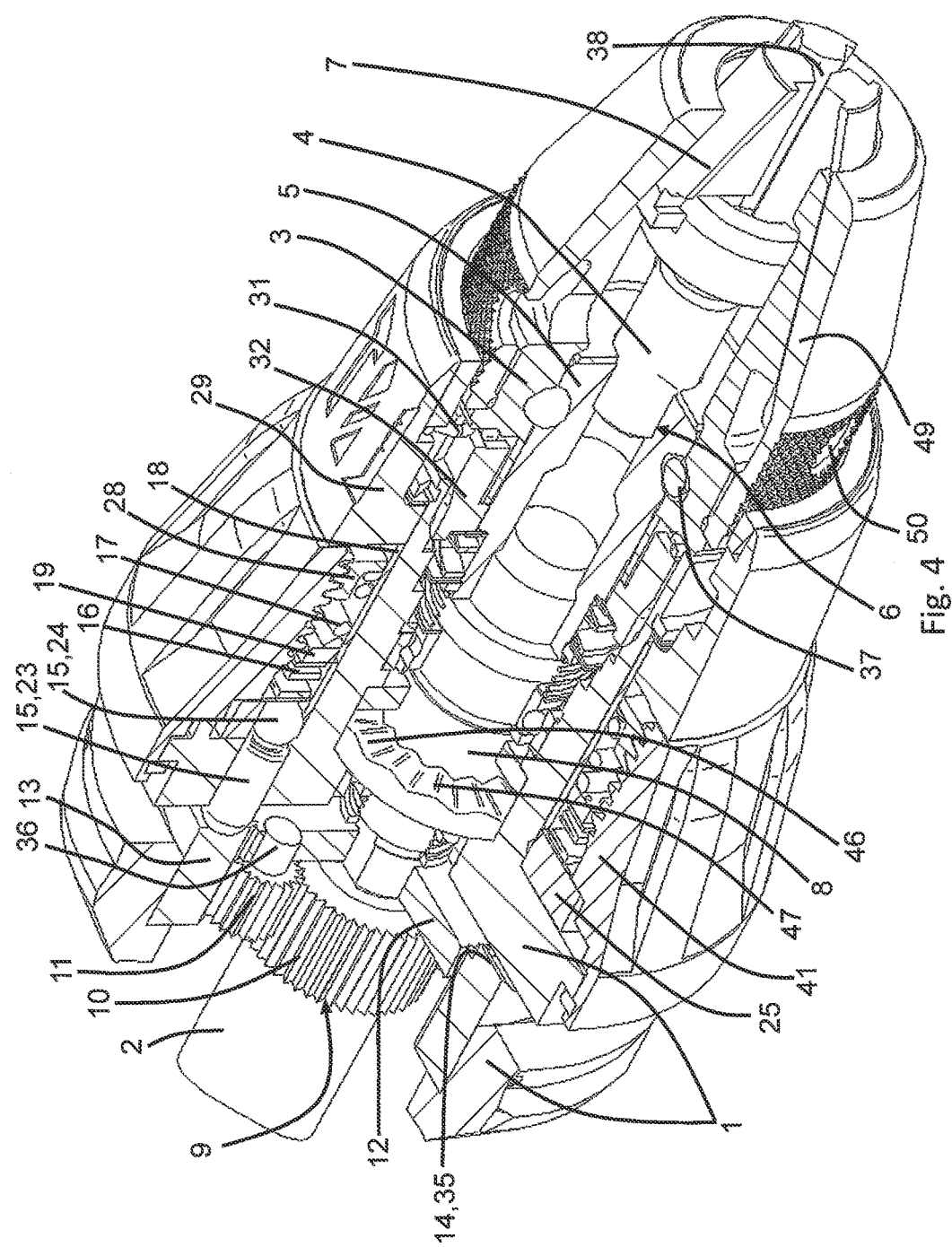
FIG. 4 shows a partially cut-away 3D view of the drilling device in the screwing configuration.
Figure 5:
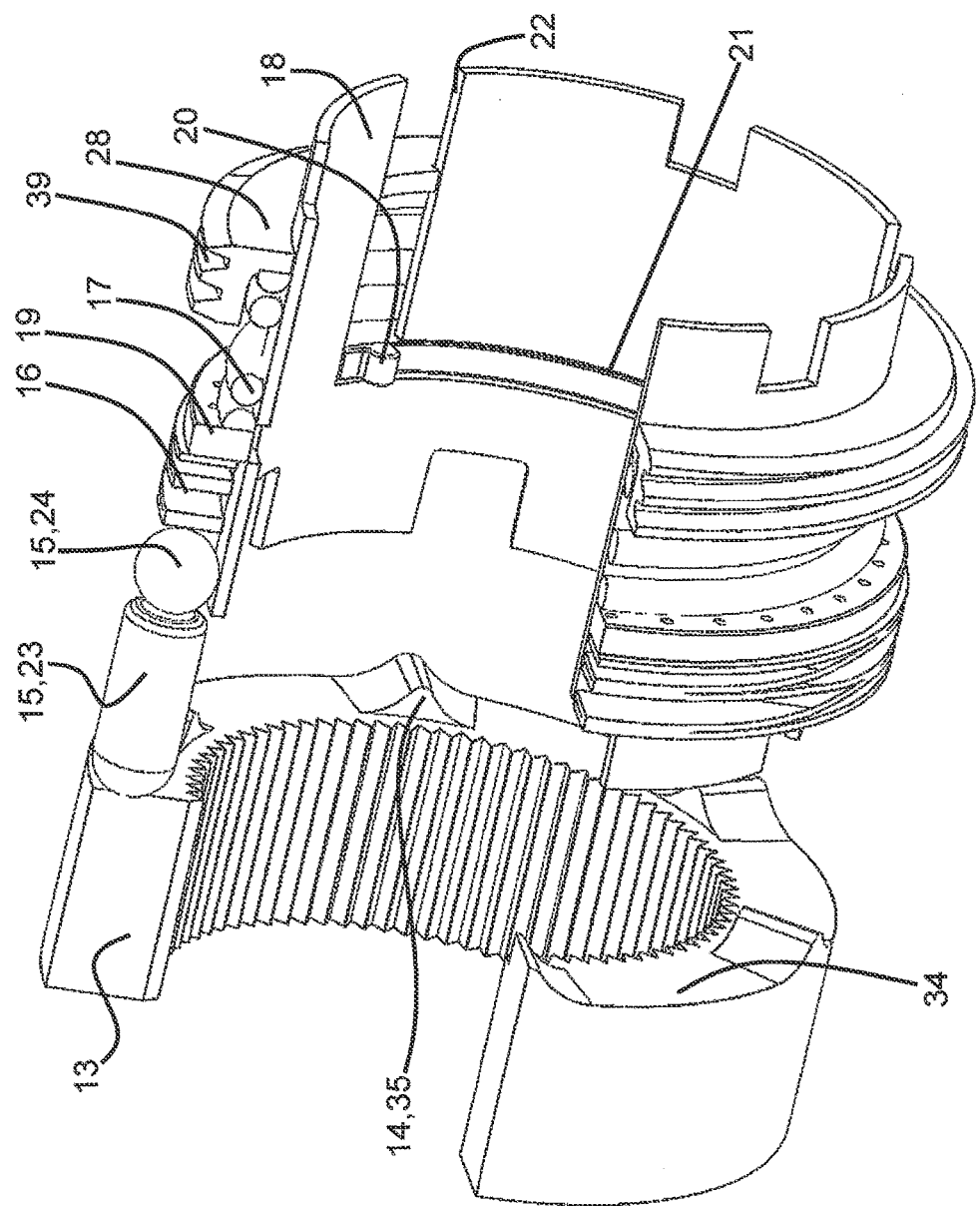
FIG. 5 shows a detail of the drilling device in the screwing configuration.
Figure 6:
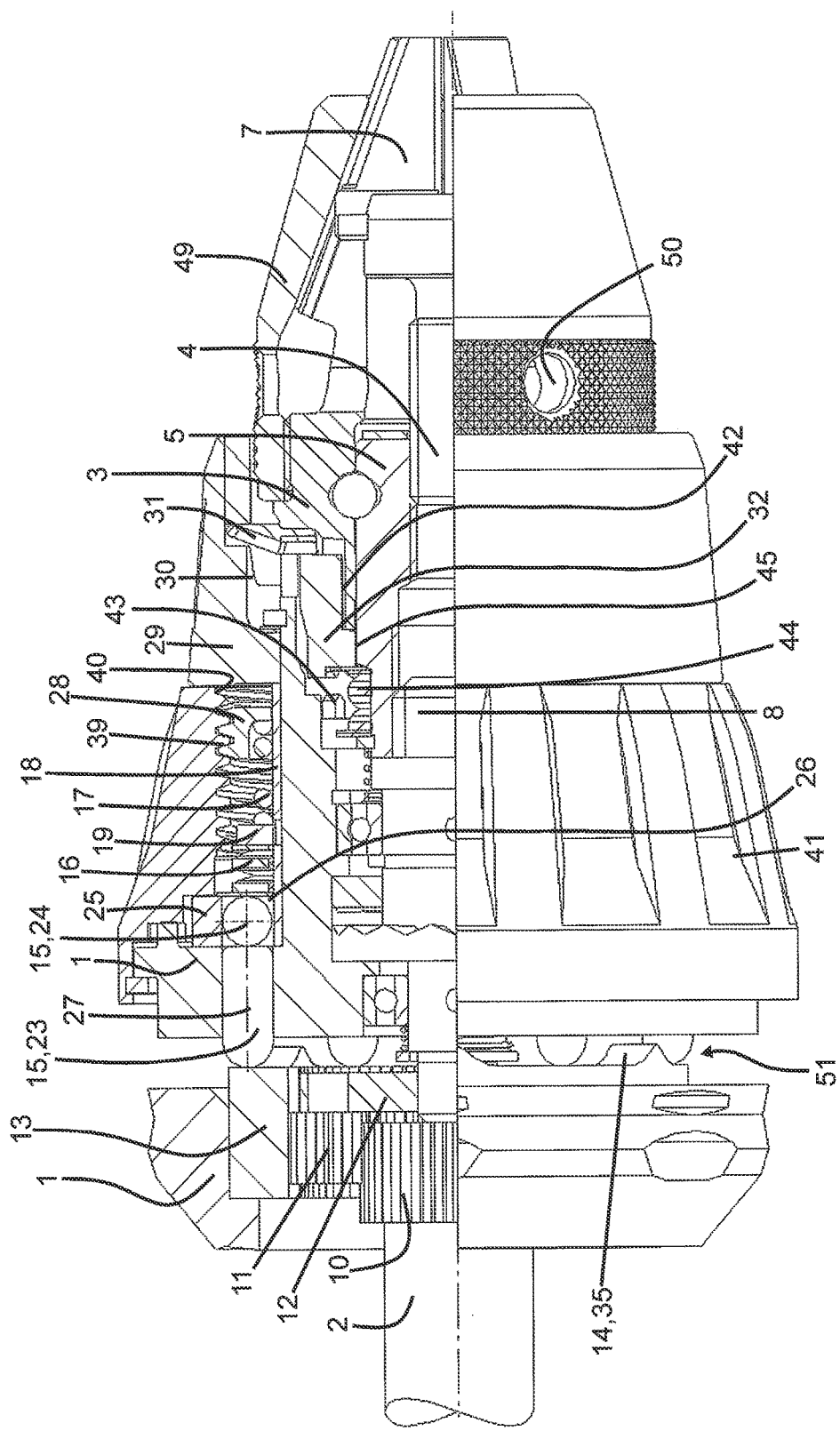
FIG. 6 shows a partially cut-away side view of the drilling device from FIG. 4.

FIGS. 4 through 6 show the drilling device and friction clutch 51 in the screwing configuration. Orifice ring 25 in this case is disposed with respect to machine housing 1 in such a way that spring clutch part 24 and corresponding ring wheel clutch part 23 are disposed in alignment with a shared spring axis 27. It is apparent from the figures that these parts have a nearly identical diameter, so that ring wheel clutch parts 23 are also able to enter or be inserted into axial openings 26 of orifice ring 25.

Friction clutch 51 is apparent as a detail in FIG. 5, shift sleeve 18 having an axial guide 22 and a radial guide 21 for a guiding element 20 of separating disk 19. Guiding element 20 is able to slide within these guides. It is furthermore apparent from FIG. 5 that, in the screwing configuration, guiding element 20 of separating disk 19 is disposed axially in alignment with axial guide 22 of shift sleeve 18, so that an axial adjustment capability exists for separating disk 19. In this constellation, a screw spring force acts upon clutch element 15, in this case, therefore, on ring wheel clutch part 23 and spring clutch part 24. Based on the axial adjustment capability of separating disk 19, a series connection exists between screw spring 17 and clamping spring 16.

In the illustrated specific embodiment, an axially adjustable compression element 28 is provided to vary the screw spring force. In the sectional views, it is apparent that compression element 28 has an outer thread 39, which is in engagement with a corresponding inner thread 40 of a torque setting sleeve 41. If torque setting sleeve 41 is rotated, compression element 28 slides axially forward or backward and compresses or relaxes the spring arrangement, in this case, in particular, screw spring 17. By compressing the spring arrangement, the torque which must be overcome to release friction clutch 51 is increased, the torque being decreased when the spring arrangement is relaxed by compression element 28. If the torque exceeds a predefined value during the screwing operation, two-part clutch element 15 moves against the screw spring force of the series connection of clamping spring 16 and screw spring 17 in the direction of tool holder 38, whereby ring wheel 13 is set in rotation with respect to the housing. In the illustrated exemplary embodiment, clamping spring 16 is designed as a sinuous spring, and screw spring 17 as a spiral spring. However, other types of springs may also be used, for example cup springs. Likewise, clamping spring 16 and screw spring 17 may be of the same spring type.

Figure 7:
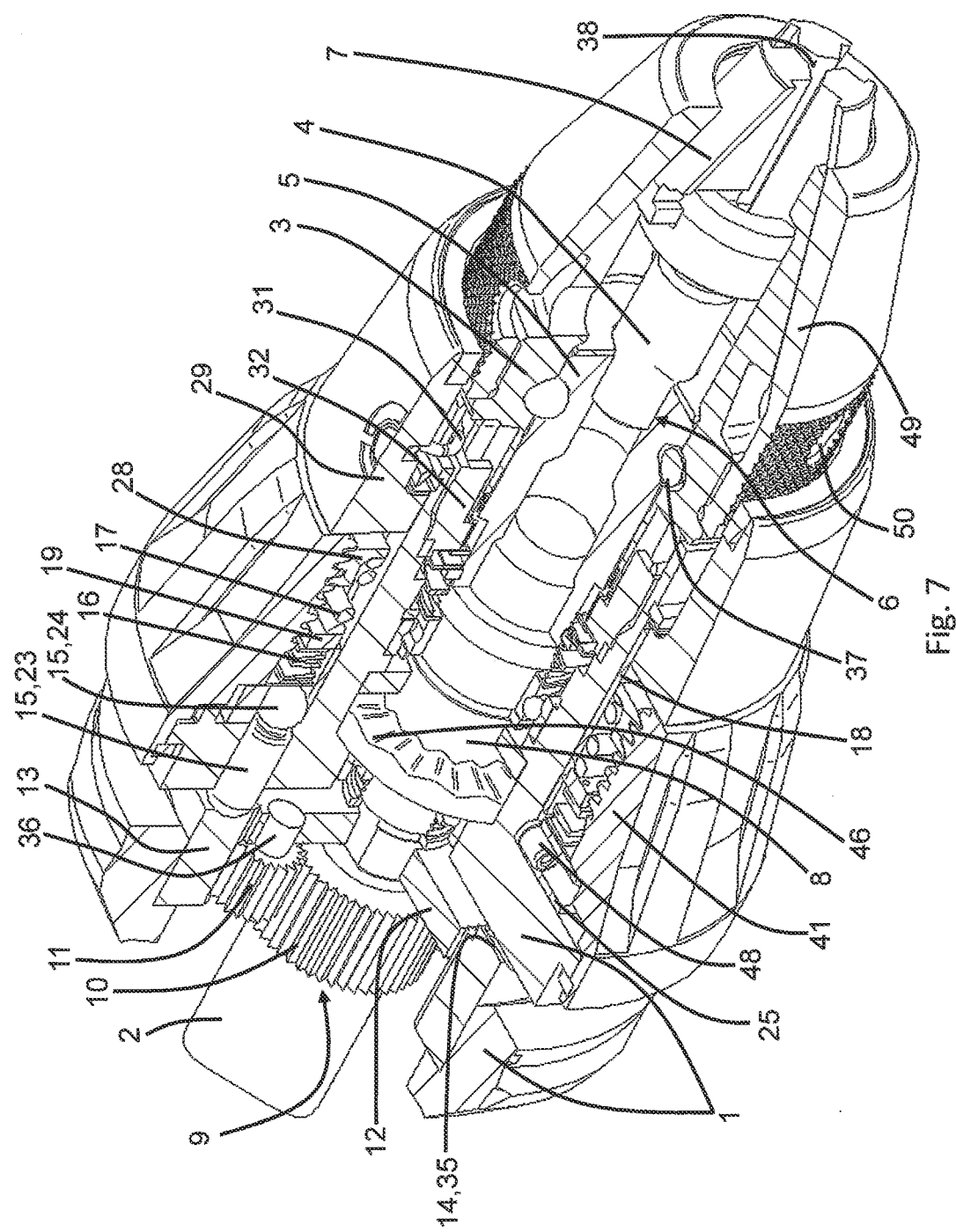
FIG. 7 shows a partially cut-away 3D view of the drilling device in a clamping configuration.
Figure 8:
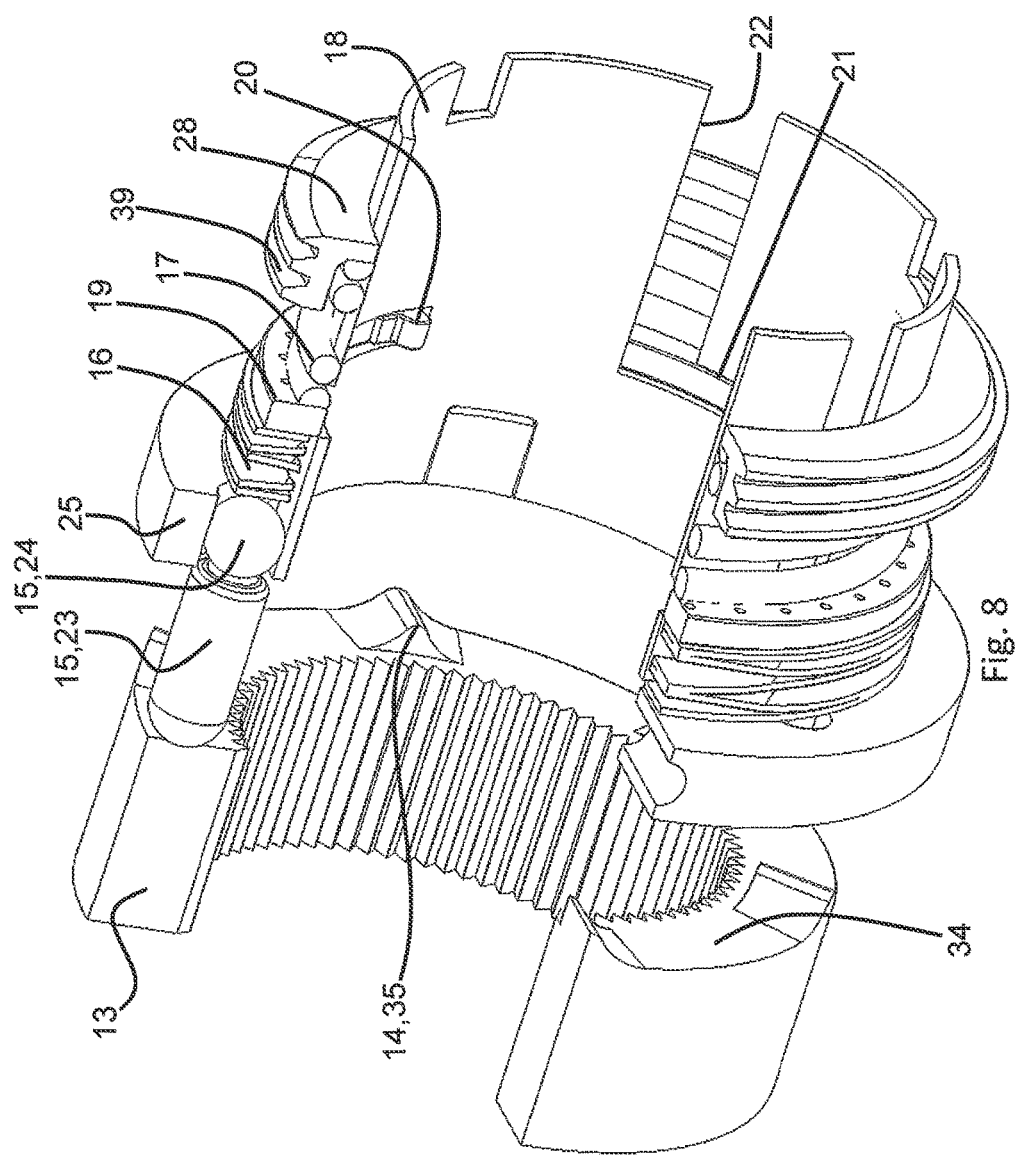
FIG. 8 shows a detailed view of the drilling configuration from FIG. 7.
Figure 9:
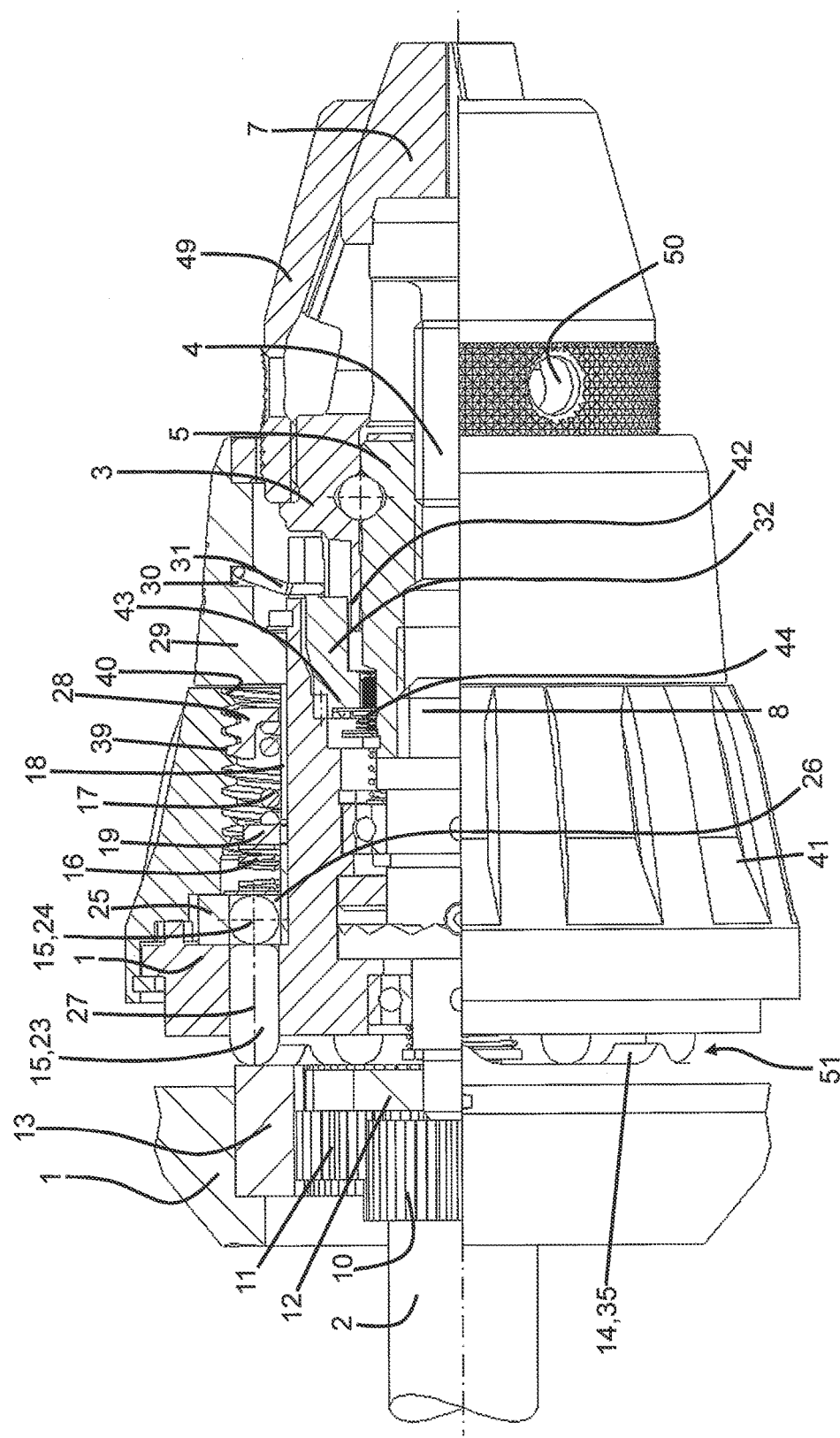
FIG. 9 shows a partially cut-away side view of the drilling device from FIG. 7.

FIGS. 7 through 9 show the drilling device and friction clutch 51 in the clamping configuration. It is apparent herein that ring wheel clutch parts 23 and spring clutch parts 24 are disposed in alignment with a shared spring axis 27 in the clamping configuration as well.

However, it is apparent from the detailed view of friction clutch 51 in FIG. 8 that guiding element 20 of separating disk 19 is now no longer disposed axially in alignment with axial guide 22 or shift sleeve 18. In the clamping configuration, guiding element 20 is fixed in its axial position by radial guide 21 of shift sleeve 18. Separating disk 19 is thus no longer able to move axially back and forth, so that screw spring 17 is rendered inactive. Only the clamping spring force of clamping spring 16 thus now acts upon clutch elements 15. If a predefined torque is exceeded, clutch element 15 thus moves against the clamping force of clamping spring 16, whereby cams 14 of ring wheel 13 are overcome by clutch element 15, and a rotation of ring wheel 13 with respect to machine housing 1 is made possible, By actuating the dial, in the illustrated specific embodiment, a sliding sleeve 32 is furthermore adjusted, which is permanently in a toothing engagement 42 with jaw holder 3, i.e., in each configuration of the drilling device. This sliding sleeve 32 blocks jaw holder 3 against a rotation with respect to machine housing 1 in the clamping configuration. For this purpose, sliding sleeve 32 is offset axially to the rear, i.e., in the direction of machine spindle 2, where it is rotatably fixedly seated with machine housing 1; e.g., meshed with a housing toothing 43. At the same time, it retains its toothing engagement 42 with jaw holder 3. To facilitate a defined adjustment of this sliding sleeve 43, it is acted upon by a restoring spring 44 on its side facing machine spindle 2. In the drilling configuration and in the screwing configuration, sliding sleeve 32 is furthermore rotatably fixedly connected to drill spindle 8, possibly even indirectly via threaded sleeve 5. In the illustrated specific embodiment, a spindle toothing engagement 45 is provided for this purpose. Thus, if drill spindle 8 is driven in drilling mode or in clamping mode, its force is transmitted to threaded sleeve 5 and likewise to jaw holder 3 via sliding sleeve 32. As a result, it is not able to cause the drill chuck to be able to be reclamped and released again only with difficulty at a later point in time. In the clamping configuration, on the other hand, sliding sleeve 32 is rotatably supported with respect to drill spindle 8 and threaded sleeve 5 but rotatably fixedly connected to machine housing 1.

Machine housing 1 furthermore has an axially formed groove, in which guide element 20 of separating disk 19 is axially guided. This represents an anti-rotation system for separating disk 19, so that the latter does not also rotate when dial 29 or shift sleeve 18 is actuated.

Figure 10:
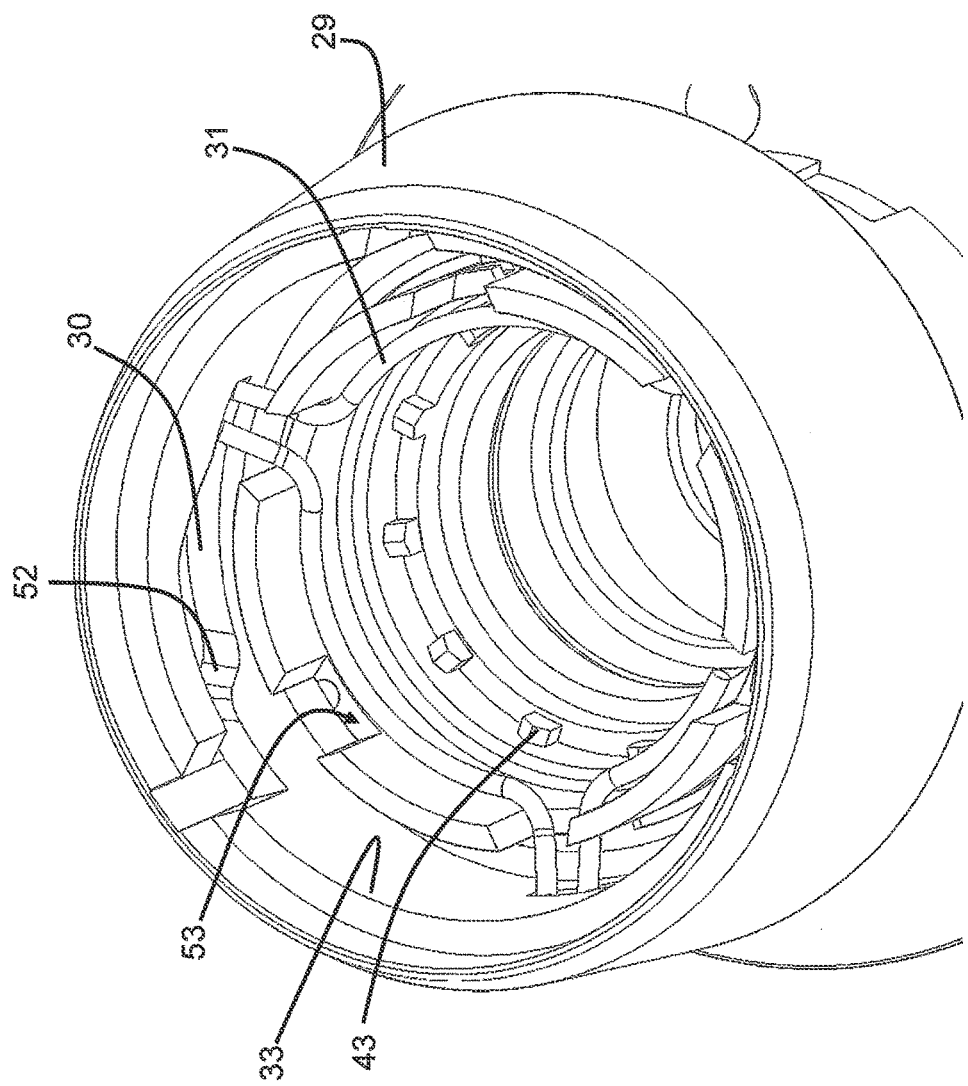
FIG. 10 shows a detail of the dial.

A detail of dial 29 is apparent in FIG. 10, in whose inner wall 33 a control element 31, designed as a control clip, is guided. This control clip is connected to sliding sleeve 32 and adjusts it in the axial direction during the switching operation. Control element 31 is rotatably fixedly supported with machine housing 1. This rotatably fixed connection is produced by a tooth arrangement 53, which is provided in machine housing 1 as well as the control clip inserted through tooth arrangement 53. A radial cam 52 is apparent on inner wall 33, which pushes the control clip in the axial direction. At the same time, housing toothing 43 is visible, with which a corresponding toothing of sliding sleeve 32 engages in clamping mode or in the clamping configuration.

The operation of the drilling device and friction clutch 51 according to the invention is described below on the basis of the exemplary embodiment illustrated in the figures in the individual operating modes.

In the drilling configuration, orifice ring 25 is disposed with respect to machine housing 1 in such a way that ring wheel clutch part 23 is supported by orifice ring 25 on its side facing away from machine spindle 2. In other words, clutch element 15 is unable to move in the direction of tool holder 38 in this configuration, so that no predefined torque facilitates a release of friction clutch 51. The force of the motor is transmitted via machine spindle 2 to sun wheel 10, which, in turn, causes a rotation of planet wheels 11, whereby the latter roll on ring wheel 13 and thus drive planet carrier 12. Planet carrier 12 is rotatably fixedly coupled with drill spindle 8, whereby the latter rotates with planet carrier 12. Drill spindle 8 transmits its rotation to threaded sleeve 5. In the drilling configuration, threaded sleeve 5 is rotatably fixedly connected to sliding sleeve 32, which, in turn, is rotatably fixedly coupled with jaw holder 3. The rotation of drill spindle 8 is thus transmitted to threaded sleeve 5 and simultaneously to jaw holder 3, whereby a clamped drilling tool rotates.

If dial 29 is now switched to the clamping configuration, for example to clamp a screwdriver bit instead of a drilling tool, sliding sleeve 32 is displaced axially to the rear with the aid of control element 31, until it is in a toothing engagement with housing toothing 43 of machine housing 1 (FIG. 9). Sliding sleeve 32 is still rotatably fixedly connected to jaw holder 3 yet rotatable with respect to threaded sleeve 5. In other words, jaw holder 3 is now rotatably fixedly supported by sliding sleeve 32 with respect to machine housing 1.

Due to the rotation of dial 29, orifice ring 24 has now also rotated with respect to machine housing 1, so that spring coupling parts 24 disposed in openings 26 are now aligned with ring wheel clutch parts 23 along shared spring axis 27. Separating disk 19 is fixed in its axial position in this configuration (FIG. 8).

If machine spindle 2 is now operated in a direction of rotation corresponding to release, the force is transmitted via sun wheel 10 to planet wheels 11 and planet carrier 12, which, in turn, drives drill spindle 8 in the direction of rotation corresponding to release. Drill spindle 8, in turn, drives threaded sleeve 5, entrainer 4 spindling into the thread of threaded sleeve 5 because jaw holder 3 is rotatably fixedly held in place with respect to machine housing 1.

Once the drilling tool has been released, it may be removed from tool holder 38, the motor of machine spindle 2 may be driven in a direction of rotation corresponding to clamping with the aid of a changeover switch when a screwdriver bit is inserted into tool holder 38. Correspondingly, threaded sleeve 5 is driven in the direction of rotation corresponding to clamping, whereby entrainer 4 spindles out of threaded sleeve 5 to clamp the screwdriver bit. Once clamping jaws 7 rest against the screwdriver bit, the latter is clamped. If the motor continues to be operated, the torque increases. If the torque exceeds a predefined value which correlates with the clamping spring force of clamping spring 16, ring wheel clutch parts 23, together with spring clutch parts 24, moves against the clamping spring force of clamping spring 16, whereby front cam 35 of ring wheel 13 is overcome by clutch elements 15. As a result, ring wheel 13 thus rotates within machine housing 1, and rotary motion is no longer transmitted from planet carrier 12 to drill spindle 8.

Once the screwing tool has been clamped into tool holder 38, dial 29 may be switched to the position of the screwing configuration. Shift sleeve 18 rotates in such a way that control element 31 reestablishes a rotatably fixed coupling between jaw holder 3 and threaded sleeve 5. Shift sleeve 18 furthermore rotates with respect to separating disk 19, so that guiding element 20 of separating disk 19 is now aligned with axial guide 22 of shift sleeve 18 (FIG. 5). In this configuration, a series connection between clamping spring 16 and screw spring 17 is active, ring wheel clutch parts 23 still being disposed in alignment with spring clutch parts 24 on a shared spring axis 27.

The force transmission of a force coming from the motor corresponds to that of the drilling mode. However, if a torque correlating with the screw spring force is exceeded, clutch element 15 is displaced in the direction of tool holder 38, whereby ring wheel 13 rotates in the housing. In other words, clutch elements 15 slip over front cams 35 of ring wheel 13. Due to this rotation of ring wheel 13, a rotation is no longer transmitted to drill spindle 8, and a possible damage to components of the drilling device is prevented.

In addition, the integrated drill chuck may also be operated in a percussion drilling configuration, for which purpose a striker 46 is provided, which has a corresponding wavy shape 47 on its side disposed with respect to tool holder 38. This percussion drilling device is designed in a manner which is known per se.

The drill chuck may be either screwed onto machine spindle 2 using a thread, or a one-part approach may be conceived of. FIG. 7 furthermore shows a locking element 48, which allows the operator to safely select the mode required in each case or the configuration required in each case. The position is thus freely selectable within the entire assembly, i.e., the system comprising dial 29, shift sleeve 18 and orifice ring 25. Furthermore, a clamping sleeve 49, which reinforces jaw holder 3, is additionally screwed thereto, jaw holder 3 and clamping sleeve 49 having radial bores 50, through which dust and dirt may be projected out of the drill chuck.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drilling device that is adjustable at least between a clamping configuration, a drilling configuration and a screwing configuration, the drilling device comprising:
    a machine housing;
    a machine spindle, which is drivable with the aid of a motor;
    a drill chuck having a jaw holder, in which clamping jaws are guided that are adjustable with the aid of a threaded connection provided between an entrainer and a threaded sleeve;
    a drill spindle that is drivable by the motor via a planetary gear set, which is disposed on a side facing the machine spindle and includes a sun wheel;
    a planet carrier that carries at least one planet wheel; and
    a ring wheel that has at least one cam that interacts with at least one clutch element fixed with respect to the ring wheel in the drilling configuration,
    wherein the at least one clutch element is supported movably against a clamping spring force of a clamping spring with respect to the ring wheel in the clamping configuration, wherein the at least one clutch element is movably supported against a screw spring force with respect to the ring wheel in the screwing configuration, wherein the screw spring force results from a series connection of the clamping spring and a screw spring, with the clamping spring and the screw spring being positioned in series along a central axis of the drilling device, and wherein the screw spring is spaced apart from the clamping spring in the axial direction of the central axis.

2. The drilling device according to claim 1, wherein a shift sleeve is provided for manual switching between the configurations.

3. A drilling device that is adjustable at least between a clamping configuration, a drilling configuration and a screwing configuration, the drilling device comprising:
- a machine housing;
- a machine spindle, which is drivable with the aid of a motor;
- a drill chuck having a jaw holder, in which clamping jaws are guided that are adjustable with the aid of a threaded connection provided between an entrainer and a threaded sleeve;
- a drill spindle that is drivable by the motor via a planetary gear set, which is disposed on a side facing the machine spindle and includes a sun wheel;
- a planet carrier that carries at least one planet wheel; and
- a ring wheel that has at least one cam that interacts with at least one clutch element fixed with respect to the ring wheel in the drilling configuration, wherein the at least one clutch element is supported movably against a clamping spring force of a clamping spring with respect to the ring wheel in the clamping configuration, wherein the at least one clutch element is movably supported against a screw spring force with respect to the ring wheel in the screwing configuration, wherein the screw spring force results from a series connection of the clamping spring and a screw spring, and wherein the screw spring and the clamping spring are separated by a separating disk, which is fixedly disposed with respect to the ring wheel in the clamping configuration and is adjustably disposed with respect to the ring wheel in the screwing configuration.

4. The drilling device according to claim 3, wherein the clamping spring is disposed on the side of the separating disk facing the ring wheel, and wherein the screw spring is disposed on the side of the separating disk facing away from the ring wheel.

5. The drilling device according to claim 3, wherein an anti-rotation system is active between the machine housing and the separating disk for rotatably fixedly supporting the separating disk with respect to the machine housing.

6. The drilling device according to claim 3, wherein the separating disk has a guiding element, which blocks a movement with respect to the ring wheel or an axial movement of the separating disk in the clamping configuration.

7. The drilling device according to claim 6, wherein the anti-rotation system is formed from the guiding element and a guiding groove provided axially in the machine housing.

8. The drilling device according to claim 6, wherein the shift sleeve includes a radial guide for guiding the guiding element in the clamping configuration and in the drilling configuration, and wherein the shift sleeve has an axial guide for guiding the guiding element in the screwing configuration.

9. The drilling device according to claim 1, wherein the at least one clutch element has a multi-part design and includes at least one ring wheel clutch part and at least one spring clutch part.

10. The drilling device according to claim 9, wherein the at least one ring wheel clutch part is guided in the machine housing or a clutch ring, which is rotatably fixedly coupled with the machine housing, and wherein an orifice ring, which is rotatably fixedly connected to the shift sleeve or forms a single piece therewith, is disposed coaxially to the machine housing and has at least one opening in which the at least one spring clutch part is disposed.

11. The drilling device according to claim 9, wherein a diameter of the at least one ring wheel clutch part is smaller than or equal to a diameter of the spring clutch part.

12. The drilling device according to claim 9, wherein the at least one spring clutch part and the at least one ring wheel clutch part corresponding thereto are disposed in alignment with a shared spring axis in the screwing configuration and in the clamping configuration.

13. The drilling device according to claim 1, wherein an axially adjustable compression element is provided for varying the screw spring force.

14. The drilling device according to claim 1, wherein the jaw holder is rotatably fixedly supported with respect to the machine housing in the clamping configuration and is rotatably fixedly supported with respect to the drill spindle in the drilling configuration.

15. The drilling device according to claim 1, wherein the shift sleeve includes a dial having a shifting gate in which a control element is guided, which is adjustable between the configurations.

16. The drilling device according to claim 15, wherein the control element is coupled with a sliding sleeve that interacts with the jaw holder such that it rotatably fixedly supports the jaw holder with respect to the machine housing exclusively in the clamping configuration.

17. The drilling device according to claim 16, wherein the control element is rotatably fixedly disposed with respect to the machine housing.

18. The drilling device according to claim 15, wherein the shifting gate is designed as an annular recess in an inner wall of the dial in which the control element, which is designed as a control clip, is guided.

19. The drilling device according to claim 1, wherein the at least one cam is a front cam provided on a front side of the ring wheel facing away from the machine spindle.

20. A friction clutch for limiting a torque in a drilling device, the friction clutch comprising:
- a ring wheel having a clutch side, which includes cams; and
- at least one clutch element resting against the clutch side, which is fixed in its position with respect to the ring wheel in a drilling configuration and which is movably supported with respect to a the ring wheel against a clamping spring force of a clamping spring in a clamping configuration, and which is movably supported with respect to the ring wheel against a screw spring force in a screwing configuration, wherein the screw spring force results from a series connection between the clamping spring and a screw spring.

21. The friction clutch according to claim 20, wherein the clamping spring and the screw spring are axially disposed on a side of the ring wheel facing away from the cams.

22. The friction clutch according to claim 20, wherein the clamping spring and the screw spring are disposed on a side of at least one clutch element facing away from the ring wheel.

23. A system for limiting torque in a drilling device, comprising:
- the drilling device according to claim 1;
- a dial;
- a shift sleeve, which is rotatably fixedly connected to the dial; and
- an orifice ring, which is rotatably fixedly connected to the dial.

* * * * *